Figure 1:
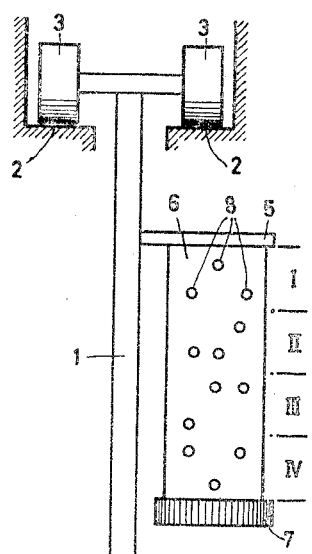
Figure 1:
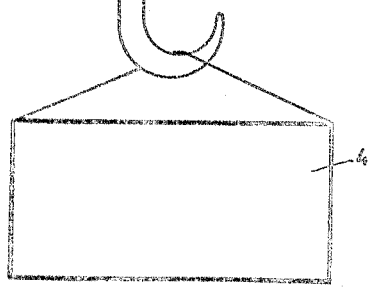

United States Patent Office 3,317,714
Patented May 2, 1967

3,317,714
DESTINATION INDICATOR FOR THE TRAVELLING UNITS OF CONVEYOR SYSTEMS
Harald Hausler, Erlangen, and Friedrich Kuhrt and Hans-Joachim Lippmann, Nurnberg, Germany, assignors to Siemens - Schuckertwerke Aktiengesellschaft, Berlin-Siemensstadt, Germany, a corporation of Germany
Filed Jan. 4, 1963, Ser. No. 249,515
Claims priority, application Germany, Jan. 10, 1962,
S 77,473
12 Claims. (Cl. 235—61.11)

Our invention relates to a destination indicator for use with the travelling units of conveying systems, such as those of the suspended-carriage type, and in a more particular aspect to destination indicators equipped with magnets for producing digital code signals.

In conveyor systems, having travelling units or conveyors of the suspended carriage type, it is often desirable to impress a destination mark directly upon the carriage or other travelling unit by which the material is transported. The destination marks are evaluated at the read-out points and utilized to control the operation of the conveyor system.

According to a known method of applying such destination marks, control cams are manually adjusted in accordance with a given code and are read out by being passed along a mechanical switching device. However, it is a serious shortcoming of such methods that the contacts are subject to wear and soiling whereby the reliability of operation may be considerably affected.

Also known, is the use of magnetic transmitters for destination marking purposes. Setting such transmitters to different distinctive markings requires reversing the magnetizing direction or the position of individual magnetic transmitter members. This necessitates using a separate signal impressing device which renders the system expensive and limits its applicability since the signal entering operations can be performed only at predetermined localities of the conveyor system where such impressing devices are installed.

It is an object of our invention to provide a magnetic destination indicator which permits impressing of indicator marks at any desired point of the conveyor system without requiring any special means therefor.

According to a feature of our invention we provide the travelling unit of a conveying system with magnets and by means of a shiftable ferromagnetic sheathing or screen we alternatively mask the magnets with respect to the read-out device of the system. We furnish the ferromagnetic screen with apertures or groups of apertures corresponding to the respective signal code of the several destination marks employed, whereby it is only necessary to shift the ferromagnetic screen depending on which destination mark is to be used.

According to another feature of our invention, we associate a pair of magnets with each code digit, the magnets being of different polarity so that, when both are masked, the flux will be shunted by the ferromagnetic screen and will not penetrate outside of the travelling unit. According to still another feature we achieve a considerable increase in the number of available destination marks by giving the two magnets of each pair the same polarity and by positioning the apertures on the ferromagnetic screen to unmask only one magnet in each pair at a time. Then a magnetic flux in one or the other direction is created within the read-out device, with said direction of flux depending on the position of the aperture relative to the magnet pair.

Preferably, according to yet another feature of our invention, we arrange the magnet pairs in a straight line and shape the ferromagnetic screen as a rotatable hollow cylinder, while furnishing the latter with round apertures and with a registering point for each destination mark. The codes signal is read out along a cylinder generatrix through the apertures in said screen at correspondingly correlated points.

Our invention contemplates effecting read-out by way of induction. However, according to a preferred feature we achieve read-out with magnetostatic devices such as Hall generators.

Figure 2:
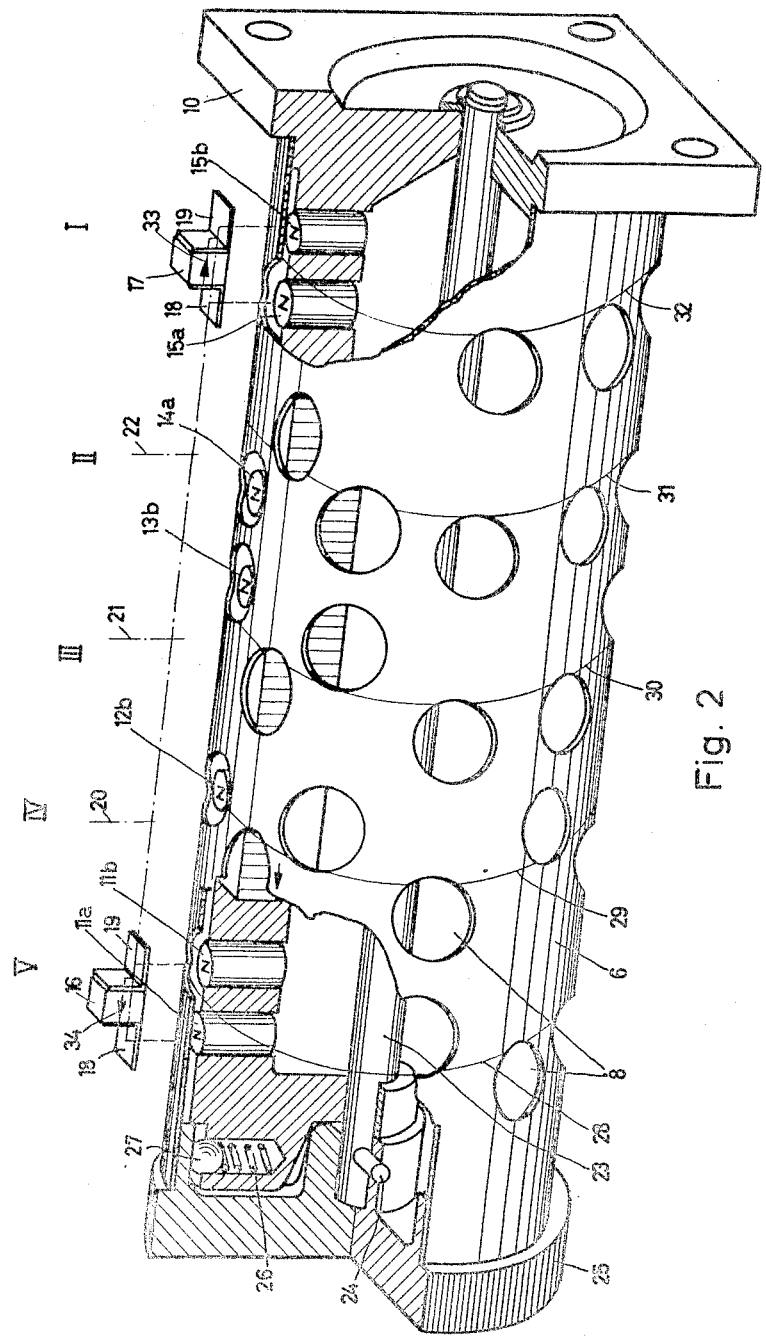

The foregoing and more specific objects, advantages and features of our invention, said features being set forth with particularity in the claims annexed hereto, will be apparent from and will be described in detail in the following with reference to the accompanying drawings, wherein:

FIG. 1 is a schematic illustration of a conveyance system utilizing the indicator of FIG. 2 and embodying features of the invention; and FIG. 2 is a perspective and partially schematic illustration of a destination indicator and a read-out system embodying features of the invention and shown in operative relative positions.

In FIG. 1 an individual hanger attachment 1 runs in a pair of rails 2 which are adapted to receive a pair of rollers 3 on the attachment 1. Suspended from a hook on the hanger attachment 1 is a cabinet 4 comprising with its contents the material to be transported to a predetermined point in the conveyor system by means of destination marks. A destination indicator 5 is secured to the hanger attachment 1. As the assembly 1, 2, 3, 4 and 5 travels in the tracks 2, the indicator 5 is adapted to closely approach read-out devices fixedly located along its path of travel.

The indicator 5 possesses a ferromagnetic hollow cylinder 6 as seen from the outside. A knurled hand wheel 7 serves for rotating the cylinder 6 and setting it to predetermined positions corresponding to destination marks. Four peripheral signal tracks, designated I, II, III, IV each comprise two peripheral rings on the ferromagnetic cylinder 6 in which rings are located a number of spaced apertures 8. Each spaced aperture 8 is also located on one of several parallel straight lines or generatrices of the cylinder 6. The apertures 8 permit penetration of flux from five permanent-magnet pairs provided along one straight line directly beneath one generatrix of the cylinder. Each pair of peripheral tracks where they cross each generatrix include but one aperture so that when a particular generatrix is aligned with the line of magnet pairs only one magnet in each pair is uncovered. A particular code results for each generatrix. Each generatrix comprising apertures arranged in accordance with a predetermined code is associated with one destination mark. The code for each generatrix may be made operative simply by turning the cylinder via the hand wheel 7 and aligning it with the line of magnets.

FIGURE 2 illustrates the destination indicator 5 of FIG. 1 and in operative sensing relation to a read-out assembly in further detail. The indicator 5 comprises a stationary core 10 which is suitably fastened to the hanger attachment 1. Along one of its generatrices or straight lines, the core 10 carries the previously mentioned five pairs of permanent magnets which are designated 11a and 11b, 12a and 12b, 13a and 13b, 14a and 14b, 15a and 15b. Magnets 12a, 13a, and 14b are masked by the ferromagnetic hollow cylinder 6 which is rotatable on core 10. The read-out assembly includes stationary read-out heads comprising Hall generators 16 and 17 which are diagrammatically shown and which include flux deflectors or yokes 18 and 19. Three other identical read-out heads (not shown for clarity) are arranged in the reference axes 20, 21 and 22. Thus, the embodiment of FIGURE 2 comprises a total of five readout tracks which are indicated by reference figures I, II, III, IV, V. As is to be noted from FIGURE 2, all the permanent magnets extend in the same direction and exhibit identical polarities.

A shaft 23, rotatably mounted within the stationary core 10, is connected with the knurled hand wheel 7 (also identified as 25) by means of a pin 24. The hollow cylinder 6 is made of sheet metal and forms a masking screen. It is secured to the hand wheel 25 and is adapted to be rotated together with the hand wheel. A register setting means comprising a spring member 26 and a ball 27 serve to arrest the cylinder 6 in predetermined registering positions.

The core 10 and hand wheel 25 both are made of nonmagnetic material, preferably brass, whereas a suitable soft-magnetic material is used for the hollow cylinder 6. The hollow cylinder 6 is provided with the plurality of apertures 8 which are arranged on either side of the tracks V, IV, III, II, I defined respectively by peripheral lines 28, 29, 30, 31, and 32 as determined by a code. In track I, the aperture is positioned on the left-hand side of the peripheral line 32 so that the magnetic flux passes through the read-out head from the left to the right-hand side, as is indicated by arrow 33. The aperture 8 in track V, on the other hand, is located on the right-hand side of the peripheral line 28 so that the direction of flux is from the right to the left-hand side as indicated by arrow 34. According to the arrangement of the remaining apertures 8 along the cylinder generatrix being read out in FIG. 2, namely along the straight line above magnets 11a and 15b, the direction of flux along track II is from left to right, and in tracks III and IV from right to left. If the hand wheel 25 is turned into the next registering position, another code is imparted to the read out device comprising the Hall generators 16, 17 and the intermediate Hall generators which have been omitted for clarity. The indicator 5 thereby controls the heading of the conveyor toward a different destination.

The number of tracks and registering points depends on the desired number of destination marks. The invention contemplates providings additional destination indicators on one hanger attachment 1, together with a corresponding number of read-out devices.

It will be obvious to those skilled in the art that the device shown in the drawings merely illustrates one embodiment of the present invention, and a large number of modifications are possible within the scope of the invention, for example the invention contemplates opening the cylinder flat to extend within a single plane with the ferromagnetic screen being shaped as a flat sheet metal member. It contemplates read-out operations being effected by means of magnetic-field-responsive resistances instead of Hall generators, or by other conventional inductive or magnetostatic read-out devices. In each case the invention provides for a destination indicator which can be set to any desired marker signal at any desired point in the conveyor system with relatively simple means of high operational reliability.

We claim:
1. For conveyor units of a conveyor system, a destination indicator to energize a sensing device, comprising a body, a plurality of permanent magnets mounted on said body, and a ferromagnetic screen movably mounted on said body and shiftable to a plurality of given positions, said screen defining a plurality of apertures in predetermined locations corresponding to the locations of predetermined ones of said magnets in each position of said screen so as to expose and magnetically mask respective ones of said magnets according to respective codes corresponding to each position of said screen.

2. A destination indicator as claimed in claim 1, further comprising read-out means positioned in the path of said destination indicator for reading out a magnetic read-out signal, said read-out means comprising a plurality of Hall generators.

3. For conveyor units of a conveyor system, a destination indicator to energize a sensing device, comprising a body, a plurality of permanent magnets mounted on said body, and a ferromagnetic screen movably mounted on said body and shiftable to a plurality of given positions, said screen defining a plurality of apertures in predetermined locations corresponding to the locations of predetermined ones of said magnets in each position of said screen so as to expose and magnetically mask respective ones of said magnets according to respective codes corresponding to each position of said screen, said magnets being arranged in pairs, the apertures in said screen being located to expose only one of each pair of magnets in each position of said screen and thereby affect a magnetic digital read-out signal.

4. For conveyor units of a conveyor system, a destination indicator to energize a sensing device, comprising a body, a plurality of permanent magnets mounted on said body, and a ferromagnetic screen movably mounted on said body and shiftable to a plurality of given positions, said screen defining a plurality of apertures in predetermined locations corresponding to the locations of predetermined ones of said magnets in each position of said screen so as to expose and magnetically mask respective ones of said magnets according to respective codes corresponding to each position of said screen, said magnets being arranged in pairs with like poles extending toward said screen, the apertures of said screen being located to expose one of each pair of magnets and to mask the other magnet of each pair thereby affecting a magnetic digital read-out signal.

5. For conveyor units of a conveyor system, a destination indicator to energize a sensing device, comprising a body, a plurality of permanent magnets mounted on said body, and a ferromagnetic screen movably mounted on said body and shiftable to a plurality of given positions, said screen defining a plurality of apertures in predetermined locations corresponding to the locations of predetermined ones of said magnets in each position of said screen so as to expose and magnetically mask respective ones of said magnets according to respective codes corresponding to each position of said screen, said magnets being arranged along a straight line.

6. For conveyor units of a conveyor system, a destination indicator to energize a sensing device, comprising a body, a plurality of permanent magnets mounted on said body, and a ferromagnetic screen movably mounted on said body and shiftable to a plurality of given positions, said screen defining a plurality of apertures in predetermined locations corresponding to the locations of predetermined ones of said magnets in each position of said screen so as to expose and magnetically mask respective ones of said magnets according to respective codes corresponding to each position of said screen, said magnets being arranged in pairs along a straight line, the apertures in said screen being located to expose only one of each pair of magnets in each position of said screen and thereby affect a magnetic digital read-out signal.

7. For conveyor units of a conveyor system, a destination indicator to energize a sensing device, comprising a body, a plurality of permanent magnets mounted on said body, and a ferromagnetic screen movably mounted on said body and shiftable to a plurality of given positions, said screen defining a plurality of apertures in predetermined locations corresponding to the locations of predetermined ones of said magnets in each position of said screen so as to expose and magnetically mask respective ones of said magnets according to respective codes corresponding to each position of said screen, said magnets being arranged in pairs along a straight line with like poles extending toward said screen, the apertures of said screen being located to expose one of each pair of magnets and to mask the other magnet of each pair thereby affecting a magnetic digital read-out signal.

8. For conveyor units of a conveyor system, a destination indicator to energize a sensing device, comprising a body, a plurality of permanent magnets mounted on said body, and a hollow cylindrical ferromagnetic screen forming a sleeve around said body and being rotatable to a plurality of given positions, said screen defining a plurality of apertures in predetermined locations corresponding to the locations of predetermined ones of said magnets in each position of said screen so as to expose and magnetically mask respective ones of said magnets according to respective codes corresponding to each position of said screen.

9. For conveyor units of a conveyor system, a destination indicator to energize a sensing device, comprising a body, a plurality of permanent magnets mounted on said body, and a hollow cylindrical ferromagnetic screen forming a sleeve around said body and being rotatable to a plurality of given positions, said screen defining a plurality of apertures in predetermined locations corresponding to the locations of predetermined ones of said magnets in each position of said screen so as to expose and magnetically mask respective ones of said magnets according to respective codes corresponding to each position of said screen, said magnets being arranged in pairs, the apertures in said screen being located to expose only one of each pair of magnets in each position of said screen and thereby affect a magnetic digital read-out signal.

10. For conveyor units of a conveyor system, a destination indicator to energize a sensing device, comprising a body, a plurality of permanent magnets mounted on said body, and a hollow cylindrical ferromagnetic screen forming a sleeve around said body and being rotatable to a plurality of given positions, said screen defining a plurality of apertures in predetermined locations corresponding to the locations of predetermined ones of said magnets in each position of said screen so as to expose and magnetically mask respective ones of said magnets according to respective codes corresponding to each position of said screen, said magnets being arranged in pairs with like poles extending toward said screen, the apertures of said screen being located to expose one of each pair of magnets and to mask the other magnet of each pair thereby affecting a magnetic digital read-out signal.

11. For conveyor units of a conveyor system, a destination indicator to energize a sensing device, comprising a body, a plurality of permanent magnets mounted on said body, and a hollow cylindrical ferromagnetic screen forming a sleeve around said body and being rotatable to a plurality of given positions, said screen defining a plurality of apertures in predetermined locations corresponding to the locations of predetermined ones of said magnets in each position of said screen so as to expose and magnetically mask respective ones of said magnets according to respective codes corresponding to each position of said screen, each position of said cylinder corresponding to one destination of said conveyor, a magnetic signal being adapted to be read out along a generatrix of said cylinder.

12. A destination indicator as claimed in claim 11, further comprising read-out means positioned in the path of said destination indicator for reading out a magnetic read-out signal, said read-out means comprising a plurality of Hall generators.

References Cited by the Examiner
UNITED STATES PATENTS

| | | | |
|---|---|---|---|
| 3,173,533 | 3/1965 | Zuck | 198—38 |
| 3,200.933 | 8/1965 | Schenk et al. | 198—38 |

MAYNARD R. WILBUR, *Primary Examiner.*

DARYL W. COOK, *Assistant Examiner.*